United States Patent
Akimoto (10) Patent No.: US 10,180,318 B2
(45) Date of Patent: Jan. 15, 2019

(54) STEREO CAMERA APPARATUS, VEHICLE PROVIDED WITH STEREO CAMERA APPARATUS, AND NON-TRANSITORY RECORDING MEDIUM

(71) Applicant: KYOCERA Corporation, Kyoto (JP)

(72) Inventor: Kazumasa Akimoto, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 127 days.

(21) Appl. No.: 15/358,464

(22) Filed: Nov. 22, 2016

(65) Prior Publication Data

US 2017/0074651 A1 Mar. 16, 2017

Related U.S. Application Data

(63) Continuation of application No. PCT/JP2015/002704, filed on May 28, 2015.

(30) Foreign Application Priority Data

May 28, 2014 (JP) .................. 2014-110242

(51) Int. Cl.
*H04N 7/18* (2006.01)
*G01C 3/06* (2006.01)
(Continued)

(52) U.S. Cl.
CPC ............... *G01C 3/06* (2013.01); *B60R 11/04* (2013.01); *G01C 3/085* (2013.01); *G03B 35/08* (2013.01);
(Continued)

(58) Field of Classification Search
CPC .... B60K 2350/2008; B60K 2350/2013; B60R 11/04; B60R 2300/105; G01C 3/06;
(Continued)

(56) References Cited

U.S. PATENT DOCUMENTS 8,922,626 B2  12/2014  Aoki
2005/0046584 A1*  3/2005  Breed ............... B60C 11/24
                                             340/13.31
(Continued)

FOREIGN PATENT DOCUMENTS

EP    2 500 748 A2   9/2012
JP    H07-225126 A   8/1995
(Continued)

OTHER PUBLICATIONS

Miyaji et al, Effect on Hasty State of Driver's Visual perception (Year: 2012).*

(Continued)

*Primary Examiner* — Shan E Elahi

(74) *Attorney, Agent, or Firm* — Studebaker & Brackett PC (57) ABSTRACT

A stereo camera apparatus, and a vehicle provided with a stereo camera apparatus, can detect an object targeted for detection in a wider spatial range, calculate the distance to a subject with high accuracy, and perform object detection with high accuracy. The stereo camera apparatus includes a first imaging unit configured to image a first area as a first image, a second imaging unit that images a second area as a second image, the second area being partially shifted from the first area in a direction differing from a direction along the baseline length, and a controller that calculates the distance to a subject using an overlapping region between the first image and the second image.

11 Claims, 8 Drawing Sheets

(51) Int. Cl.
*H04N 13/25* (2018.01)
*H04N 13/257* (2018.01)
*G03B 35/08* (2006.01)
*B60R 11/04* (2006.01)
*G06K 9/00* (2006.01)
*G01C 3/08* (2006.01)
*G06T 7/70* (2017.01)
*H04N 13/20* (2018.01)

(52) U.S. Cl.
CPC ..... *G06K 9/00798* (2013.01); *G06K 9/00818* (2013.01); *G06K 9/00825* (2013.01); *G06T 7/70* (2017.01); *H04N 7/181* (2013.01); *H04N 13/20* (2018.05); *H04N 13/25* (2018.05); *H04N 13/257* (2018.05); *B60K 2350/2008* (2013.01); *B60K 2350/2013* (2013.01); *B60R 2300/105* (2013.01)

(58) Field of Classification Search
CPC ............... G03B 35/08; G06K 9/00798; G06K 9/00818; G06K 9/00825; G06T 7/004; H04N 13/02; H04N 13/0239; H04N 13/025; H04N 13/0257; H04N 7/181
USPC .......................................................... 348/47
See application file for complete search history.

(56) References Cited

U.S. PATENT DOCUMENTS

| | | | |
|---|---|---|---|
| 2012/0062743 A1* | 3/2012 | Lynam | B60Q 9/005 348/148 |
| 2012/0154591 A1* | 6/2012 | Baur | B60R 1/00 348/148 |
| 2012/0236124 A1* | 9/2012 | Aoki | G01C 3/085 348/47 |
| 2013/0076866 A1 | 3/2013 | Drinkard et al. | |
| 2013/0094705 A1 | 4/2013 | Tyagi et al. | |
| 2015/0210275 A1* | 7/2015 | Huberman | B60W 30/00 382/104 |

FOREIGN PATENT DOCUMENTS

| | | |
|---|---|---|
| JP | 2000-261028 A | 9/2000 |
| JP | 2001-305681 A | 11/2001 |
| JP | 2001-305682 A | 11/2001 |
| JP | 2005-24463 A | 1/2005 |
| JP | 2012-198075 A | 10/2012 |
| WO | 2013/006649 A2 | 1/2013 |

OTHER PUBLICATIONS

International Search Report issued in PCT/JP2015/002704 dated Aug. 25, 2015.

Written Opinion issued in PCT/JP2015/002704; dated Aug. 25, 2015; with English language Concise Explanation.

Partial Supplmentary EP Search Report dated Dec. 14, 2017, from corresponding EP Appl No. 15800361.6, 15 pp.

* cited by examiner

STEREO CAMERA APPARATUS, VEHICLE PROVIDED WITH STEREO CAMERA APPARATUS, AND NON-TRANSITORY RECORDING MEDIUM

CROSS-REFERENCE TO RELATED APPLICATION

This application claims priority to and the benefit of Japanese Patent Application No. 2014-110242 filed May 28, 2014, the entire contents of which are incorporated herein by reference.

TECHNICAL FIELD

This disclosure relates to a stereo camera apparatus and a vehicle provided with a stereo camera apparatus.

BACKGROUND

One example of a road object detection apparatus for a vehicle detects an object by first using two stereo cameras, one installed on each side, to take photographs of two ranges that are shifted horizontally and then measuring the distance to a subject based on respective pieces of image information (for example, JP H07-225126 A (PTL 1)). In order to detect white lines on the road and traffic signs as well with the stereo cameras that photograph ranges that are shifted horizontally, the left and right stereo cameras both need to have a wide field of view (viewing angle) in the vertical direction. At times, such as during bad weather or when the vehicle in front is a large vehicle, it may not be possible to detect white lines, signs and traffic signals, and the like until they are at close range. For this reason as well, the stereo cameras need to have a wide field of view. On the other hand, if the field of view widens in the vertical direction, the accuracy of distance measurement and the accuracy of object detection decrease.

CITATION LIST

Patent Literature

PTL 1: JP H07-225126 A

SUMMARY

In order to solve the aforementioned problem, a stereo camera apparatus according to this disclosure includes a first imaging unit configured to image a first area as a first image; and a second imaging unit configured to image a second area as a second image, the second area being partially shifted from the first area in a direction differing from a direction along a baseline length. The stereo camera apparatus further includes a controller configured to calculate a distance to a subject using an overlapping region between the first image and the second image.

Furthermore, in order to solve the aforementioned problem, a vehicle according to this disclosure is provided with a stereo camera apparatus. The stereo camera apparatus includes a first imaging unit configured to image a first area and a second area as a first image; and a second imaging unit configured to image the second area and a third area as a second image, the third area being partially shifted from the first area in a direction differing from a direction along a baseline length. The stereo camera apparatus further includes a controller configured to calculate a distance to a subject using an overlapping region between the first image and the second image.

Furthermore, in order to solve the aforementioned problem, a non-transitory recording medium according to this disclosure is a computer-readable non-transitory recording medium storing instructions to be executed by a stereo camera apparatus. The stereo camera apparatus includes a first imaging unit configured to image a first area as a first image; and a second imaging unit configured to image a second area as a second image, the second area being partially shifted from the first area in a direction differing from a direction along a baseline length. The instructions include calculating a distance to a subject using an overlapping region between the first image and the second image. The instructions also include detecting a different object than the subject in a region in the second image excluding the overlapping region.

DETAILED DESCRIPTION

The following describes embodiments based on the drawings.

Figure 1:
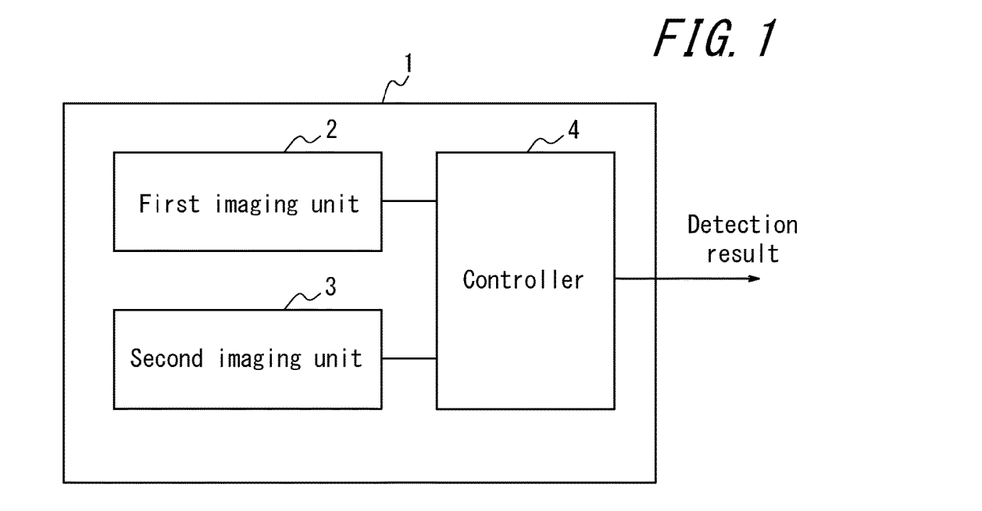
FIG. 1 is a functional block diagram of a stereo camera apparatus according to one of the disclosed embodiments.

FIG. 1 is an example of a functional block diagram of a stereo camera apparatus 1 according to one of the disclosed embodiments. As illustrated in FIG. 1, the stereo camera apparatus 1 according to this embodiment includes a first imaging unit 2, a second imaging unit 3, and a controller 4. The stereo camera apparatus 1 calculates distance using captured images and outputs, from the controller 4, the calculated distance and the result of object detection performed within the captured images (for example, whether or not the subject is an object targeted for detection, and the type of object).

In this embodiment, the stereo camera apparatus 1 is described as including the first imaging unit 2, second imaging unit 3, and controller 4 in a single housing, as illustrated in FIG. 1. The stereo camera apparatus 1 may also be configured by causing camera modules to function as imaging units and causing an MPU external to the camera modules to function as a controller for the camera modules.

Although the functions of the stereo camera apparatus 1 according to this disclosure are described, it should be noted that other functions provided in the stereo camera apparatus 1 are in no way excluded. The stereo camera apparatus 1 according to this embodiment may, for example, be installed in a vehicle such as an automobile. The stereo camera apparatus 1 may, however, be installed in a vehicle other than an automobile. Also, the stereo camera apparatus 1 communicates with electronic device-related elements, but in the following explanation, the elements constituting other functional units are omitted from the drawings and are not described.

Figure 2:
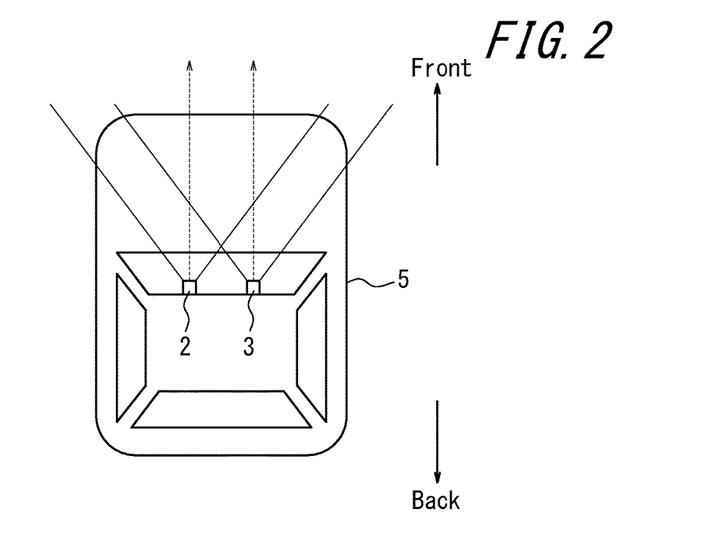
FIG. 2 is a layout drawing of the first imaging unit and the second imaging unit in FIG. 1 in a vehicle.

FIG. 2 is a layout drawing of the first imaging unit 2 and the second imaging unit 3 in FIG. 1 in a vehicle 5. At least the first imaging unit 2 and the second imaging unit 3 are installed in the vehicle 5. The first imaging unit 2 and the second imaging unit 3 are installed at a position that allows imaging of the area in front of the vehicle 5 (such as a position inside the vehicle 5, in contact with the windshield) and image the area in front of the vehicle 5.

In FIG. 2, the first imaging unit 2 and the second imaging unit 3 are installed at a position that allows imaging of the area in front of the vehicle 5, but instead of the area in front, these imaging units may be installed and used at a position that allows imaging of the surrounding area, such as the area on the side or the area behind the vehicle 5.

Figure 3:
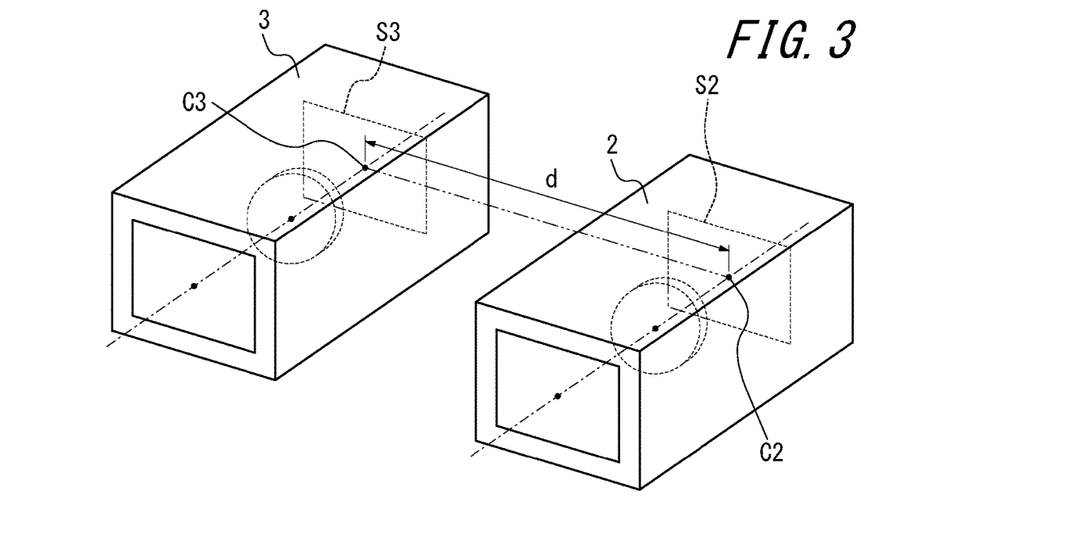
FIG. 3 is a perspective view of the first imaging unit and the second imaging unit in FIG. 1.

FIG. 3 is a perspective view of the first imaging unit 2 and the second imaging unit 3 in FIG. 1. The first imaging unit 2 and the second imaging unit 3 are installed with a gap of a baseline length d therebetween. The baseline length is the distance between an optical axis position C2 on an imaging plane S2 of the first imaging unit 2 and an optical axis position C3 on an imaging plane S3 of the second imaging unit 3.

The attachment position and attachment orientation of the first imaging unit 2 and the second imaging unit 3 are exactly determined in advance so that the imaging units can image the same subject with parallax. At this time, the first imaging unit 2 and the second imaging unit 3 image ranges shifted in a direction that differs from a direction along the baseline length. The direction that differs from the direction along the baseline length refers to a direction that is not parallel to the direction along the baseline length. Details are provided below.

The description now returns to FIG. 1. The first imaging unit 2 and the second imaging unit 3 each include an optical system and image pickup device (sensor). The optical system is configured by an optical element such as a lens and forms an image. The image pickup device may, for example, be a CMOS or a CCD image pickup device and captures the image formed by the optical system as a monochrome image. The image pickup device may also include a color filter on the light receiving surface and may capture the image formed by the optical system as a color image.

The first imaging unit 2 and the second imaging unit 3 output the captured monochrome image or color image to the controller 4. As an example, in this embodiment, the first imaging unit 2 is described as being an imaging unit that can capture color images, and the second imaging unit 3 is described as being an imaging unit that can capture monochrome images. The image captured by the first imaging unit 2 is referred to as a first image, and the image captured by the second imaging unit 3 is referred to as a second image.

When the first image is a color image and the second image is a monochrome image, a brighter optical system may be used in the first imaging unit 2 than in the second imaging unit 3. By using a bright optical system that suppresses the difference in the amount of received light in the first imaging unit 2, the difference may be adjusted to be zero.

The controller 4 performs object detection within the first image acquired from the first imaging unit 2. During object detection within the first image, the controller 4 determines whether an object set in advance as a target of detection in the first image is included in the first image.

Similarly, the controller 4 performs object detection within the second image acquired from the second imaging unit 3. During object detection within the second image, the controller 4 determines whether an object set in advance as a target of detection in the second image is included in the second image. Details are provided below.

There are at least two different patterns for the attachment position and attachment orientation of the first imaging unit 2 and the second imaging unit 3. These two different patterns are illustrated in FIG. 4 and FIG. 5.

Figure 4:
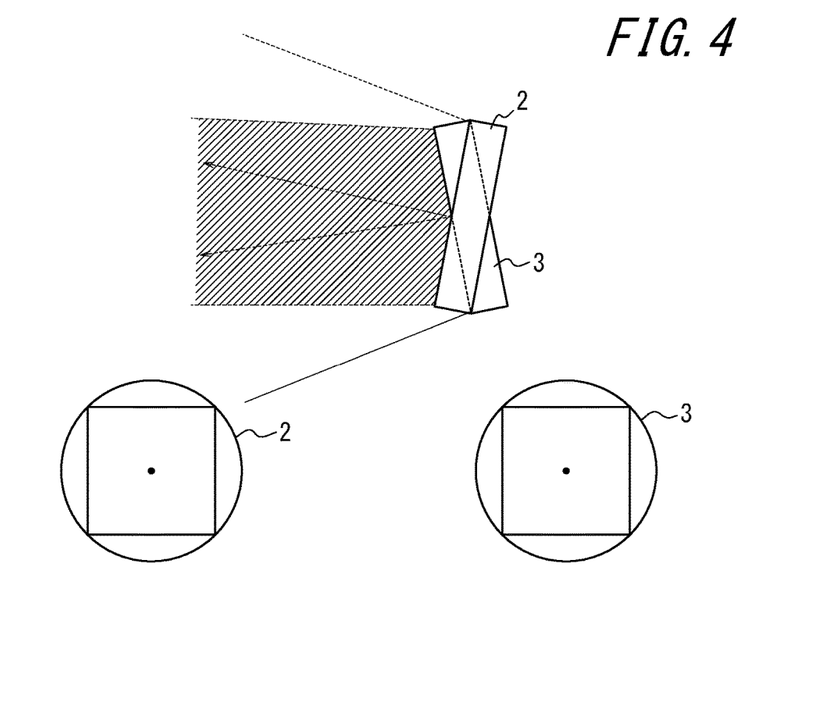
FIG. 4 illustrates the structure of an image pickup device and an image circle of the first imaging unit and the second imaging unit in FIG. 1.

FIG. 4 illustrates the configuration of the image pickup device (indicated as a rectangle) and the image circle (indicated as a circle) of the first imaging unit 2 and the second imaging unit 3 when the stereo camera apparatus in FIG. 1 is installed in the vehicle 5.

As illustrated in FIG. 4, the optical system and the image pickup device are disposed in the first imaging unit 2 and the second imaging unit 3 so that the optical axis of the optical system (indicated by the arrows) passes through the center of the light receiving region of the image pickup device. In the stereo camera apparatus 1, the first imaging unit 2 and the second imaging unit 3 are separated by a predetermined baseline length and are fixed so that, as viewed in a direction along the baseline length, the optical axes of the optical systems in the first imaging unit 2 and the second imaging unit 3 are shifted. Furthermore, the shift in the optical axes of the optical systems in the first imaging unit 2 and the second imaging unit 3 is set so that the imaging ranges of the first imaging unit 2 and the second imaging unit 3 partially overlap (in FIG. 4, the partially overlapping range is shaded). With this configuration, the second imaging unit 3 images a range partially shifted from the range imaged by the first imaging unit 2 in a direction that differs from the direction along the baseline length. The stereo camera apparatus 1 is installed in the vehicle so that the direction along the baseline length and the horizontal direction are parallel, and so that the first imaging unit 2 and the second imaging unit 3 can image an imaging range in a desired direction with respect to the vehicle. As a result of this installation, the first imaging unit 2 and the second imaging unit 3 can image ranges that are shifted in the vertical direction while partially overlapping.

Figure 5:
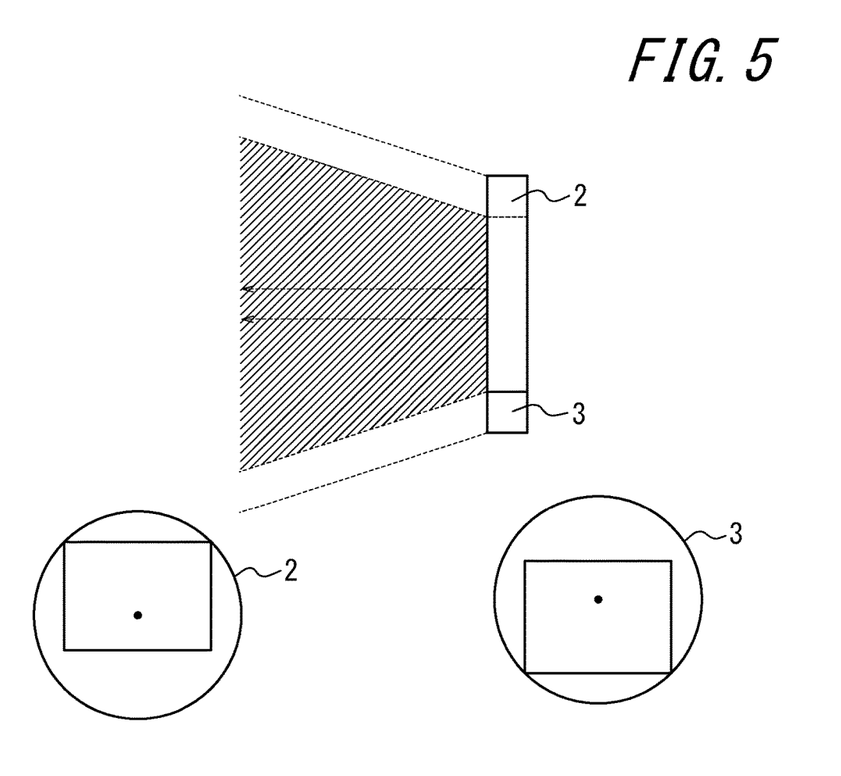
FIG. 5 illustrates another structure of an image pickup device and an image circle of the first imaging unit and the second imaging unit in FIG. 1.

FIG. 5 illustrates another configuration of the image pickup device (indicated as a rectangle) and the image circle (indicated as a circle) of the first imaging unit and the second imaging unit when the stereo camera apparatus in FIG. 1 is installed in the vehicle 5.

The optical axes of the optical systems in the first imaging unit 2 and the second imaging unit 3 (indicated by the arrows) are parallel and overlap as viewed in a direction along the baseline length. Lines that pass through the center of the light receiving surface of the image pickup devices in the optical systems of the first imaging unit 2 and the second imaging unit 3 and that are perpendicular to the light receiving surface are perpendicular to a direction along the baseline length and are parallel to each other. The image pickup devices of the first imaging unit 2 and the second imaging unit 3 are set to be shifted in a direction parallel to the light receiving surface of the image pickup devices and so that the imaging ranges partially overlap (in FIG. 5, the partially overlapping range is shaded). With this configuration, the second imaging unit 3 images an area partially shifted from the area imaged by the first imaging unit 2 in a direction that differs from the direction along the baseline length. The stereo camera apparatus is installed so that the direction along the baseline length and the horizontal direction are parallel, and so that the first imaging unit 2 and the second imaging unit 3 can image an imaging region in a desired direction with respect to the vehicle. As a result of this installation, the first imaging unit 2 and the second imaging unit 3 can image ranges that are shifted in the vertical direction while partially overlapping.

Figure 6:
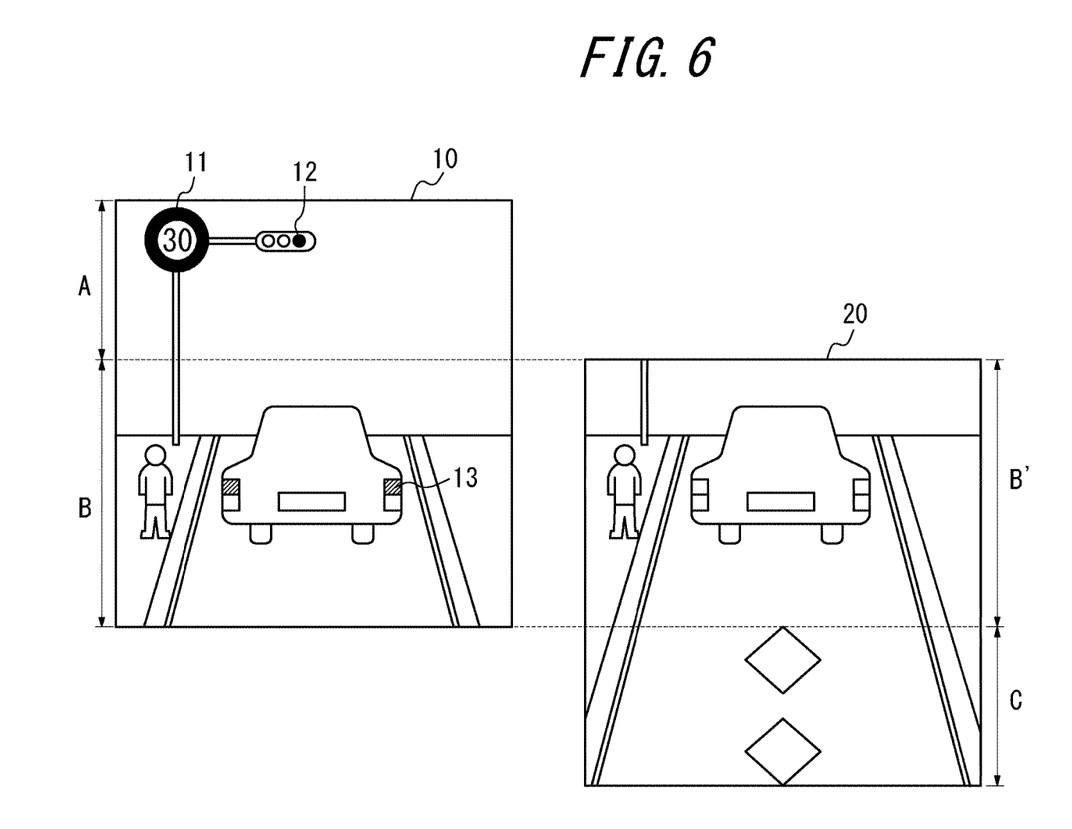
FIG. 6 illustrates a captured image of the area ahead of the vehicle in FIG. 2.

FIG. 6 illustrates a captured image of the area ahead of the vehicle in FIG. 2. In greater detail, FIG. 6 illustrates a first image 10 (color image) captured by the first imaging unit 2 and output to the controller 4 and a second image 20 (monochrome image) captured by the second imaging unit 3 and output to the controller 4.

As described above, the first imaging unit 2 and the second imaging unit 3 image areas shifted in a direction that differs from a direction along the baseline length. Hereinafter, the first imaging unit 2 and the second imaging unit 3 are described as being able to image ranges that are shifted in the vertical direction while partially overlapping, as described above. In the following explanation, the regions that partially overlap are referred to as region B and region B'. In region B and region B', the same object can be imaged. As illustrated in FIG. 6, the first image 10 includes region A and region B, and the second image 20 includes region B' and region C. Region A is the region in the first image excluding the overlapping region (region B), and region C is the region in the second image excluding the overlapping region (region B').

Regions A, B, B', and C are now described with reference to FIG. 6. In the color image illustrated in FIG. 6, regions 11 to 13 contain color information indicating the color red. The regions 11 to 13 containing color information are shaded.

Region A is a region that captures traffic signs, traffic signals, and the like. The traffic signs and traffic signals are objects with specific content by color and indicate content such as a speed limit or permission to proceed. Therefore, by disposing a color filter in region A, region A is preferably turned into a region allowing capture of a color image. The object imaged in region A and the object imaged in the below-described region C are different objects indicating different content.

As described below, region B is a region used together with region B' to calculate the distance to a subject in front of the vehicle. Hence, high sensitivity and high resolution (high resolution for a specific type of light) are required for region B. Therefore, without disposing a color filter in region B, region B may be set as a region allowing capture of a monochrome image. In this case, region A alone may be a region allowing capture of a color image.

Region B is a region that images a vehicle (for example, a vehicle body, and the turn signal, brake light, headlight, and tail light of a vehicle), person, animal, obstacle on the road, or the like in front of the vehicle provided with the stereo camera apparatus. These subjects are subjects for which the distance from the vehicle is preferably calculated. In region B, the first imaging unit images a subject with specific content by color (for example, the vehicle turn signal or vehicle brake light). Therefore, by disposing a color filter in region B, region B may be set as a region allowing capture of a color image.

The boundary between region A and region B may be set at any position. For example, the boundary may be set at a position such that region B includes the horizon.

Like region B, region B' is a region that images a vehicle (for example, a vehicle body, and the turn signal, brake light, headlight, and tail light of a vehicle), person, animal, obstacle on the road, or the like in front of the vehicle provided with the stereo camera apparatus. For similar reasons as for region B, region B' may be a region allowing capture of a color image or may be a region allowing capture of a monochrome image.

Region C is a region that images a road marking, a dividing line on the road, or the like located closer than region B' (closer to the stereo camera apparatus). Road markings and dividing lines on the road indicate content such as no stopping or parking or the existence of a signal ahead. The color information for the subjects imaged in region C is comparatively less useful than the color information for the subjects imaged in the other regions. In other words, in region C, characteristics other than color (such as pattern or outline) are more important than color. Therefore, region C is preferably a region allowing capture of a monochrome image.

The controller 4 detects objects set in advance in all of the regions. In greater detail, in region A, the controller 4 detects objects set in advance such as traffic signs and traffic signals. As a method for object detection, the controller 4 may perform processing by gradient calculation, HOG that for example uses SVM learning data, or the like. Upon detecting the same target in region B and region B', the controller 4 calculates the distance to the subject based on image coordinates. The distance is calculated by stereo matching or the like. The calculated distance is output along with the result of object detection. Furthermore, the controller 4 detects a dividing line on the road or the like using region C.

The controller 4 determines whether the object detected in region B' is an object set to be differentiated by color, as described below. When the object detected in region B' is an object set to be differentiated by color, the controller 4 detects the color of a corresponding region in the first image corresponding to the region occupied by the object in the second image. Furthermore, the controller 4 uses the detected color to differentiate the object detected in the second image.

As described above, a plurality of objects are set in advance in the controller 4 as targets of detection. For example, a vehicle brake light is an example of an object set as a target of detection in region B and region B' among all of the regions. The brake light indicates whether the driver has braked by whether the light is on. It may be difficult to make the determination of whether the light is on by using characteristics other than color (such as pattern or shape). Therefore, for each object that cannot be differentiated with only a characteristic other than color, it is possible to set whether the object is to be differentiated by color.

Objects set to be differentiated by color are not limited to vehicle brake lights. For example, vehicle turn signals, headlights, and tail lights are examples of objects set to be differentiated by color.

Figure 7:
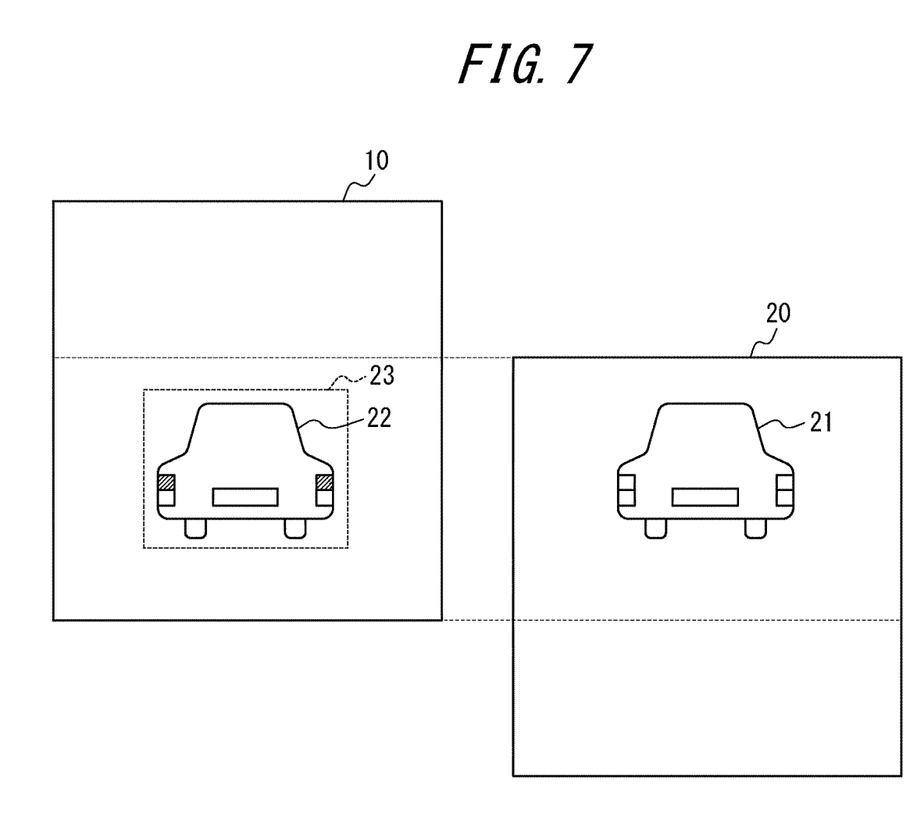
FIG. 7 illustrates a captured image of the area ahead of the vehicle in FIG. 2 when detecting an object set to be differentiated by color.

FIG. 7 illustrates a captured image of the area ahead of the vehicle in FIG. 2. The following is a detailed description of processing by the controller 4 to differentiate objects detected in the images by color.

The controller 4 detects a region in the first image 10 corresponding to a region in the second image 20 occupied by an object that was detected in the second image 20 and is to be differentiated by color. As the detection method, the controller 4 first searches in region B'. Next, as the corresponding region in region B, the controller 4 detects i) the region occupied by an object having the same characteristics, such as outline, as the object detected in region B' and ii) the surrounding region around that region. Furthermore, the controller 4 uses the color detected in the corresponding region to differentiate the object detected in region B'.

For example, when the image illustrated in FIG. 7 is captured, the controller 4 detects, as the corresponding region to region 21, i) a region 22 in the first image 10 corresponding to region 21 occupied by an object in the second image 20 and ii) a surrounding region 23 around the region 22. The controller 4 then detects the color of region 22 and the surrounding region 23. Any method may be used to determine the surrounding region 23. The detected color is used to differentiate the object detected in the second image 20. When the shaded area in the first image 10 is red, the vehicle in FIG. 7 is differentiated as (determined to be) braking. On the other hand, when the shaded area in the first image 10 is a color indicating that the light is not on, such as white, then the vehicle in FIG. 7 is differentiated as not braking.

Furthermore, as another function, the controller 4 performs object detection in a corresponding region in the first image, which is a color image, corresponding to a region in the second image of an object detected in the second image, which is a monochrome image.

Figure 8:
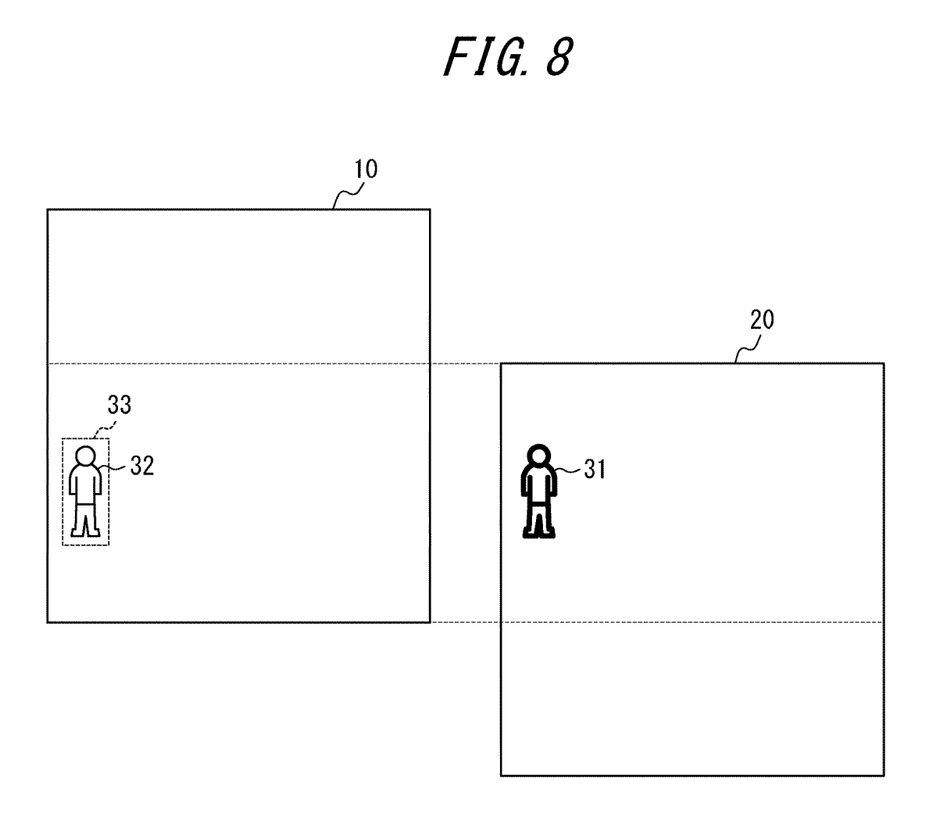
FIG. 8 illustrates yet another example of a captured image of the area ahead of the vehicle in FIG. 2 when performing object detection in a corresponding region in a first image corresponding to a region occupied by an object detected in a second image.

FIG. 8 illustrates a captured image of the area ahead of the vehicle in FIG. 2. With reference to FIG. 8, the processing executed by the controller 4 to detect the corresponding region and perform object detection is described in detail.

In FIG. 8, in order to indicate that the second image 20, which is a monochrome image, has comparatively higher sensitivity and resolution than the first image 10, which is a color image, the outline of the figure of a person in the second image 20 is shown in bold.

Upon detecting an object in the second image 20, as the corresponding region to region 31, the controller 4 detects i) a region 32 corresponding to region 31 occupied by the image and ii) a surrounding region 33 around the region 32. The method for detecting the corresponding region is similar to the method described for FIG. 7. When searching for an object in the corresponding region, the controller 4 increases the detection sensitivity (lowers the threshold of the detection level). The controller 4 may be configured to execute this processing only when no object was detected in the first image 10.

Figure 9:
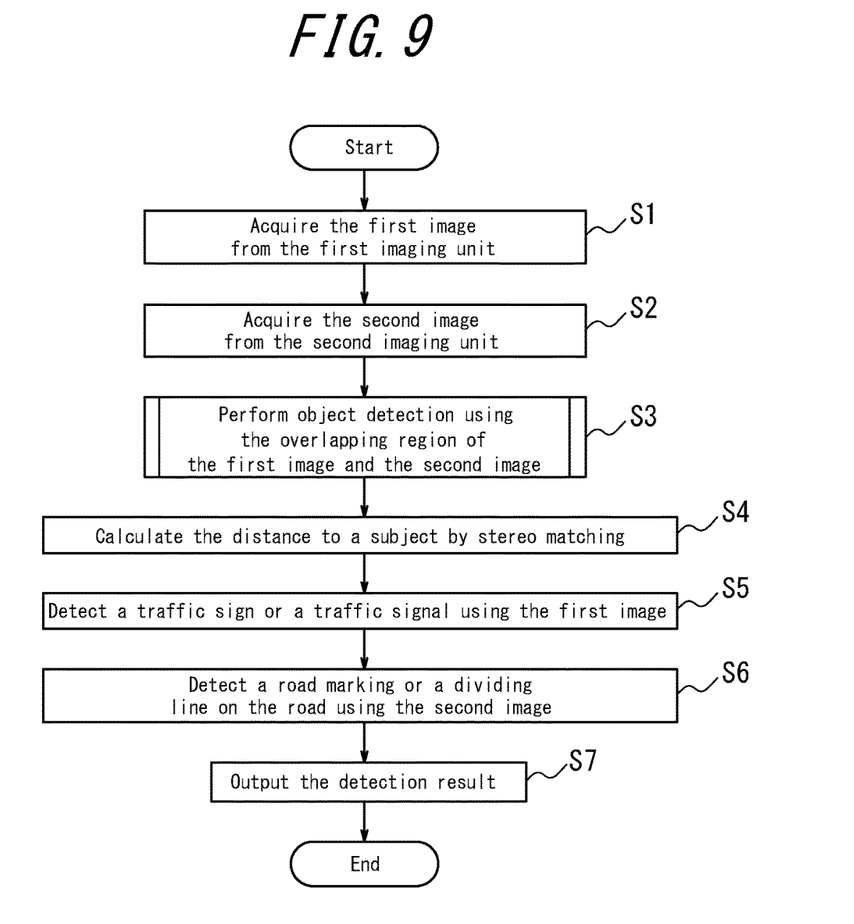
FIG. 9 is a flowchart of operations by the controller in FIG. 1.

FIG. 9 is a flowchart of operations by the controller in FIG. 1. The controller acquires the first image from the first imaging unit (step S1) and acquires the second image from the second imaging unit (step S2). The order of step S1 and step S2 may be reversed.

Next, the controller performs object detection using the overlapping region between the first image and the second image (step S3). Details are provided in the explanation of FIG. 10. Next, the controller calculates the distance to the subject by stereo matching (step S4). The controller detects a traffic sign or a traffic signal using the first image (step S5) and detects a road marking or a dividing line on the road using the second image (step S6). Furthermore, the controller outputs the detection result (step S7). Steps S3 and S4, step S5, and step S6 may be in any order.

Figure 10:
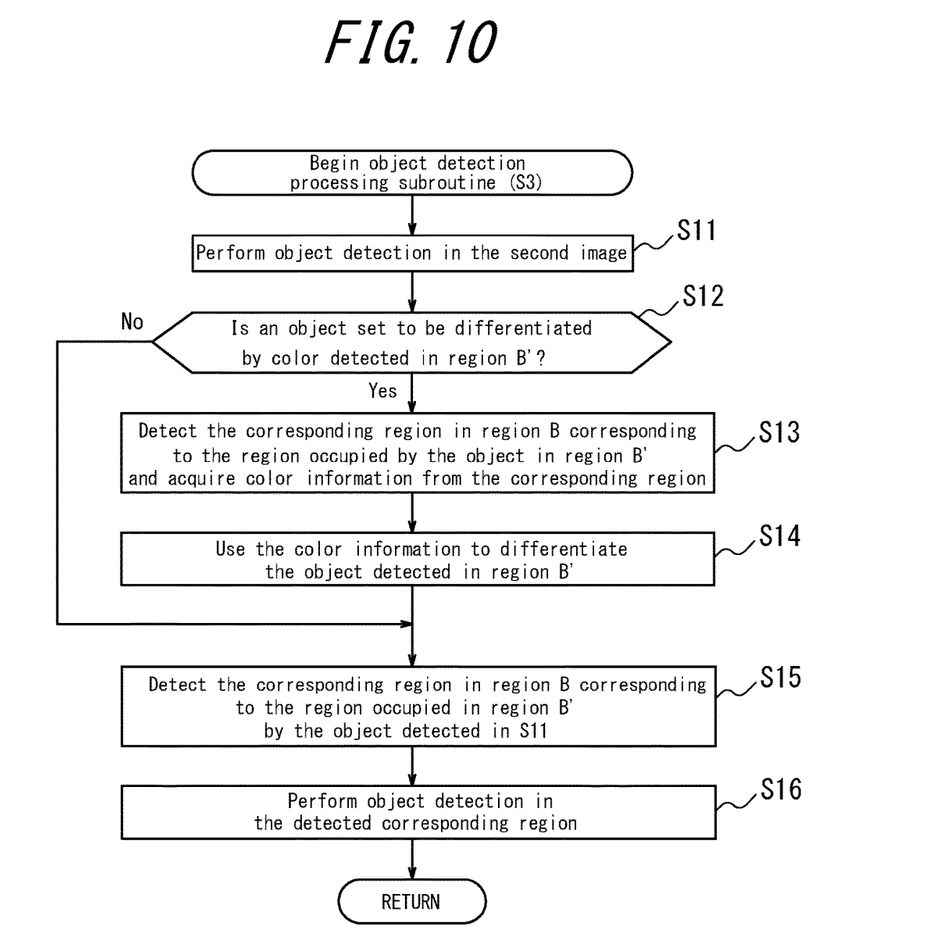
FIG. 10 illustrates an object detection processing subroutine by the controller in FIG. 1.

FIG. 10 illustrates an object detection processing subroutine by the controller in FIG. 1. The controller performs object detection in the second image (step S11). Upon detecting an object set to be differentiated by color in region B' (step S12: Yes), the controller detects the corresponding region in region B corresponding to the region occupied by the object in region B' and acquires color information from the corresponding region (step S13). The controller uses the acquired color information to differentiate the object detected in region B' (step S14). When the result of step S12 is No, the processing in step S13 and step S14 is not performed.

Next, the controller detects the corresponding region in region B corresponding to the region occupied in region B' by the object detected in step S11 (step S15). Furthermore, the controller performs object detection in the detected corresponding region (step S16). Step S12 to step S14 may be reversed in order with step S15 and step S16.

As described above, the range imaged by the first imaging unit and the range imaged by the second imaging unit are shifted in a direction (vertical direction) different from a direction along the baseline length. Therefore, an object targeted for detection can be detected in a wider spatial range, the distance to a subject can be calculated with high accuracy, and object detection can be performed with high accuracy.

The controller also detects different objects indicating different content between the region in the first image excluding the overlapping region and the region in the second image excluding the overlapping region. Therefore, duplicate images of these different objects are no longer captured, eliminating unnecessary data.

The controller also detects color in the surrounding region as the corresponding region in the first image corresponding to the region occupied by the object detected in the second image. Therefore, erroneous detection can be prevented.

The controller also limits the region for performing object detection and increases the detection sensitivity in that region. In this way, while preventing erroneous detection, it is possible to prevent the object detected in the second image from not being detected in the first image, for which the sensitivity and resolution are relatively low.

Furthermore, when the first image is a color image and the second image is a monochrome image, a brighter optical system is used in the first imaging unit than in the second imaging unit. As a result, the difference in the amount of received light from the second imaging unit, which is a camera that captures a monochrome image, can be reduced.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various members, units, steps, and the like may be reordered in any logically consistent way. Furthermore, when embodying a method according to this disclosure, units or steps may be combined into one or divided.

When the stereo camera apparatus according to this disclosure is configured by a computer, a program containing a description of the processing for achieving the functions is stored within the computer or in an external memory. The stereo camera apparatus is achieved by the central processing unit (CPU) of the computer reading and executing the program. Such a program may, for example, be distributed by the sale, transfer, lending, or the like of a portable recording medium such as a DVD, CD-ROM, or the like. Such a program may also, for example, be distributed by being stored in the memory of a server on a network and then transferred from the server to another computer over the network. For example, the computer that executes such a program can temporarily store, in its own memory, the program recorded on the portable recording medium or transferred from the server. As another embodiment of the program, a computer may read the program directly from the portable recording medium and execute processing in accordance with the program. Also, each time the program is transferred from the server to the computer, the computer may execute processing in accordance with the received program.

REFERENCE SIGNS LIST

1 Stereo camera apparatus
2 First imaging unit
3 Second imaging unit
4 Controller
5 Vehicle
10 First image captured by first imaging unit
20 Second image captured by second imaging unit

The invention claimed is:

1. A stereo camera apparatus comprising:
a first imaging unit configured to image a first area as a first image;
a second imaging unit configured to image a second area as a second image, the second area being partially shifted from the first area in a direction differing from a direction along a baseline, the baseline extending between an optical axis position on an imaging plane of the first imaging unit and an optical axis position on an imaging plane of the second imaging unit; and
a controller configured to calculate a distance to a subject using an overlapping region between the first image and the second image,
the controller further configured to detect a different object indicating different content than the subject in a region in the second image outside the overlapping region.

2. The stereo camera apparatus of claim 1, wherein the controller is further configured to detect at least one of a traffic sign and a traffic signal in the first image.

3. The stereo camera apparatus of claim 1, wherein the controller is further configured to detect at least one of a road marking and a dividing line on a road in the second image.

4. The stereo camera apparatus of claim 1, wherein the controller is further configured to detect different objects indicating different content between a region in the first image outside the overlapping region and a region in the second image outside the overlapping region.

5. The stereo camera apparatus of claim 1, wherein
the first imaging unit is configured to capture a color image; and
the second imaging unit is configured to capture a monochrome image.

6. The stereo camera apparatus of claim 5, wherein the first imaging unit is configured to capture a color image only in a region in the first image outside the overlapping region.

7. The stereo camera apparatus of claim 5, wherein the controller is further configured to, upon detecting an object set to be differentiated by color in the second image, use a color in a corresponding region in the first image corresponding to a region occupied by the object in the second image to differentiate the object detected in the second image.

8. The stereo camera apparatus of claim 5, wherein the controller is further configured to perform object detection in a corresponding region in the first image corresponding to a region in the second image occupied by an object detected in the second image.

9. The stereo camera apparatus of claim 5, wherein a brighter optical system is used in the first imaging unit than in the second imaging unit.

10. A vehicle provided with a stereo camera apparatus, the stereo camera apparatus comprising:
a first imaging unit configured to image a first area and a second area as a first image;
a second imaging unit configured to image the second area and a third area as a second image, the third area being partially shifted from the first area in a direction differing from a direction along a baseline, the baseline extending between an optical axis position on an imaging plane of the first imaging unit and an optical axis position on an imaging plane of the second imaging unit; and
a controller configured to calculate a distance to a subject using an overlapping region between the first image and the second image,
the controller further configured to detect a different object indicating different content than the subject in a region in the second image outside the overlapping region.

11. A computer-readable non-transitory recording medium storing instructions to be executed by a stereo camera apparatus,
the stereo camera apparatus comprising:
a first imaging unit configured to image a first area as a first image; and
a second imaging unit configured to image a second area as a second image, the second area being partially shifted from the first area in a direction differing from a direction along a baseline, the baseline extending between an optical axis position on an imaging plane of the first imaging unit and an optical axis position on an imaging plane of the second imaging unit;
the instructions comprising:
calculating a distance to a subject using an overlapping region between the first image and the second image;
detecting a different object than the subject in a region in the second image excluding the overlapping region, and
detecting a different object indicating different content than the subject in a region in the second image outside the overlapping region.

* * * * *